Patented Nov. 14, 1939

UNITED STATES PATENT OFFICE 2,180,115

PROCESS OF PREPARING BETA-HALOGEN-BUTADIENES-1,3

Heinrich Lange and Otto Horn, Frankfort-on-the-Main-Hochst, Germany, assignors to I. G. Farbenindustrie Aktiengesellschaft, Frankfort-on-the-Main, Germany No Drawing. Application March 25, 1937, Serial No. 133,004. In Germany March 28, 1936

6 Claims. (Cl. 260—655)

The present invention relates to a process of preparing beta-halogen-butadienes-1,3.

It is known that hydrogen chloride may be split off from butenes halogenated in 1,2-positions. If for this purpose a solid alkali metal hydroxide is used there is produced as in the case of the 1,2-dichloro-butene-3 with solid potassium hydroxide, the 1-chloro-butadiene-1,3 (alpha-chlor-butadiene) (compare Muskat and Northrup "Journal of American Chemical Society," 52, 4043, 1930). During this operation polymerization products of the chlorobutadiene are also produced. If instead of a solid alkali there is used an alcoholic alkali there would have to be expected, according to the statements of Klebanski and Tschewytschalowa who in the case of 1,3-dichloro-butene-2 with alcoholic caustic potash solution obtained 3-chloro-butene-2-ol-1-ethyl-ether and the corresponding di-(chloro-butenyl)-ether, (compare "Synthetic Caoutchouc," Russian: "Ssintetischeski Kautschuk" 4, No. 6, page 16 (1935); reference in "Chemisches Centralblatt," 1936, I, 1975) the formation of 2-chloro-butene-3-ol-1-ethyl-ether or the corresponding di-(chloro-butenyl)-ether.

Now we have found that contrary to expectation the beta-halogen-butadienes-1,3 may be obtained from 1,2-dihalogen-butene without a considerable formation of polymeric products by removing the butadienes halogenated in 2-position from the reaction zone at the moment of their formation, by means of the vapor of the organic solvent. This may be done by running the 1,2-dihalogen-butene into the alkaline agent, for instance into the alcoholic alkali or into pyridine or other tertiary bases in the presence of an organic solvent, only at the boiling temperature of the solvent, so that the beta-halogen-butadiene formed, which is very readily polymerizable, may be removed at the moment of its formation from the polymerizing action of the alkaline agent by the distilling solvent. The bases may be present in excess. Alternatively a mixture of 1,2-dihalogen-butene and organic solvents may be run into the alkaline agent. It is suitable to add to the solution which is to react a small quantity of hydroquinone.

The beta-halogen-butadiene thus obtained is distinguished by the fact that it is very pure and free from higher chlorinated products; for this reason it yields good caoutchouc-like polymerization products.

Besides the 1,2-dichloro-butene-3 there may be used as starting material the 1,2-dibromo-butene-3 or the 1,2-diiodo-butene-3. There are then obtained the corresponding bromo-butadiene and iodo-butadiene. As agents splitting off halogen there may be used alkalies, such as sodium methylate and potassium methylate, sodium ethylate and potassium ethylate, pyridine, quinoline, triethanol-amine, suspensions of sodium carbonate or potassium carbonate. Useful solvents are for instance alcohols, such as methanol, ethanol, propanol, butanol, furthermore benzene, toluene, hexene, heptane, octane, acetone, methylethyl-ketone or pyridine.

The following example serves to illustrate the invention:

Into a boiling solution of sodium methylate (prepared from 30 mols of methanol and 2 atomic proportions of sodium) there are run, while stirring, 2 mols of 1,2-dichloro-butene-3 and a small quantity of hydroquinone. The mixture of methanol and 2-chloro-butadiene-1,3 which distils is eliminated and the chloro-butadiene is fractionated. The dichloro-butene which may have been carried over is reconducted into the process.

We claim:
1. The process which comprises causing agents capable of splitting off hydrogen halides to act upon a butene dihalogenated in the 1,2-positions in the presence of a boiling organic solvent having a low boiling point and eliminating from the liquid mixture the butadienes halogenated in the 2-position in the moment of their formation by means of the vapors of the solvent.

2. The process which comprises causing agents capable of splitting off hydrogen halides to act upon 1,2-dichloro-butene-3 in the presence of a boiling organic solvent having a low boiling point and eliminating from the liquid mixture the 2-chloro-butadiene-1,3 in the moment of its formation by means of the vapors of the solvent.

3. The process which comprises causing an alkali to act upon 1,2-dichloro-butene-3 in the presence of a boiling organic solvent having a low boiling point and eliminating from the liquid mixture the 2-chloro-butadiene-1,3 in the moment of its formation by means of the vapors of the solvent.

4. The process which comprises causing sodium methylate to act upon 1,2-dichloro-butene-3 in the presence of boiling methanol and distilling off the 2-chloro-butadiene-1,3 in the moment of its formation together with methanol.

5. The process which comprises causing 1,2-dichloro-butene-3 to run into a boiling mixture of an organic solvent having a low boiling point with an alkali and distilling off the 2-chloro-butadiene-1,3 in the moment of its formation together with the organic solvent.

6. The process which comprises causing 1,2-dichloro-butene-3 to run into a boiling solution of sodium methylate in methyl alcohol and distilling off the 2-chloro-butadiene-1,3 in the moment of its formation together with methanol.

HEINRICH LANGE.
OTTO HORN.